April 1, 1930. H. E. SIMSON 1,752,703
HAND DRILL OR SCREW DRIVER
Filed June 12, 1928
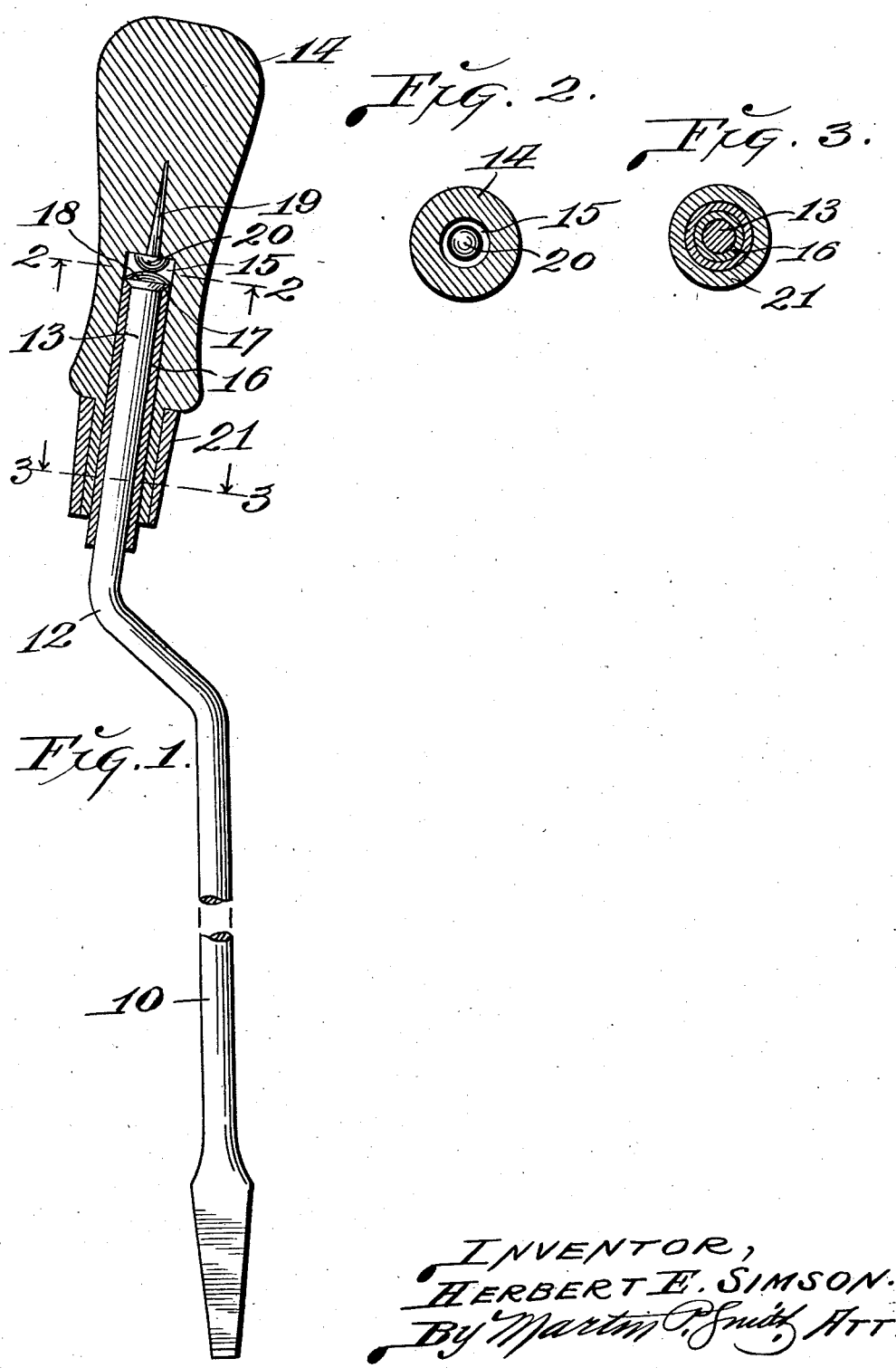

Patented Apr. 1, 1930

1,752,703

UNITED STATES PATENT OFFICE

HERBERT E. SIMSON, OF LOS ANGELES, CALIFORNIA

HAND DRILL OR SCREW DRIVER

Application filed June 12, 1928. Serial No. 284,868.

My invention relates to a hand drill or screw driver and has for its principal object the provision of a quick-acting rotary tool adapted for manual operation and which is relatively simple in construction, inexpensive of manufacture, and which may be conveniently manipulated by one hand for rapidly performing the work usually accomplished by rotary tools such as screw drivers, drills, taps and the like.

A further object of my invention is to provide a quick-acting rotary tool of the character referred to wherein the rear end of the shank or bit is formed into a crank upon which is mounted to rotate freely a handle or knob that is engaged by the hand utilized in manipulating the tool.

With the foregoing and other objects in view, my invention consists in certain novel features of construction and arrangements of parts that will hereinafter be more fully described and claimed and illustrated in the accompanying drawing, in which:

Fig. 1 is an elevational view of a quick-action rotary tool constructed in accordance with my invention, the hand or knob thereon being in longitudinal section and the end of the shank shaped to perform the functions of a screw driver.

Fig. 2 is a cross section taken on the line 2—2 of Fig. 1.

Fig. 3 is a cross section taken on the line 3—3 of Fig. 1.

Referring by numerals to the accompanying drawings which illustrate a practical embodiment of my invention, 10 designates the shank of the tool, the same being formed from a rod of steel or the like, and one end of said shank is flattened and shaped to form a screw driver bit or like tool.

The body of the shank opposite the end that is provided with the bit is bent outwardly and thence inwardly to form a crank 12, the axis of the straight terminal portion 13 of which occupies an angular position of approximately ten or twelve degrees from the axis of the straight body portion of the shank 10.

A handle 14 of wood, compressed fiber or light weight metal, such as aluminum, is provided in its forward portion with an axial bore 15 in which is seated a tubular sleeve 16 that receives the straight rear portion 13 of the shank and the inner end of said sleeve 16 is countersunk as designated by 17 in order to provide a bearing for the flanged rear end 18 of shank member 13. A pin or screw 19 having a rounded head 20 is driven into the body of the handle 14 from the bottom of bore 15 and the rounded head 20 provides an antifriction bearing for the peened-over head or flange 18.

The forward or lower end of handle 14 is reduced in diameter and receives a metal ferrule 21. The end of sleeve 16 which serves as a bearing for the straight end portion 13 of the shank projects a short distance beyond the forward or lower end of the handle in order that it may be struck with a hammer or like tool and driven into the handle in order to take up any wear that may occur between the head 20 of the pin or screw 19 and the rounded surface of the flange or head 18.

The angularity of the straight portion 13 of the shank and the length of the handle 14 are such that the center of the rear or upper end of handle 14 is coincident with a line passing through the axis of the straight forward portion of the shank 10 and as a result of such arrangement the rotation of the tool while in use is greatly facilitated and may be accomplished with very little effort on the part of the operator.

In the operation of my improved tool the screw driver bit 11 or the tool carried by the chuck, engages the work and the user's hand grasping the handle 14 applies downward pressure to the tool and at the same time repeatedly rotates the same by lateral thrust applied to the crank portion of the shank through the handle, and as a result the tool is rapidly rotated so that the bit thereon or the chuck at the end of the shank will function in the desired manner.

Thus it will be seen that I have provided a relatively simple, practical and easily operated rotary tool that is capable of being manipulated and continuously rotated with one hand, thus rendering the tool "quick acting" while in service and which tool may be conveniently employed as a screw-driver, drill, tap, reamer or other small tool or implement that must be rotated to accomplish its work.

It will be understood that minor changes in the size, form and construction of the various parts of my improved combination hand drill and screw-driver may be made and substituted for those herein shown and described without departing from the spirit of my invention, the scope of which is set forth in the appended claim.

I claim as my invention:

In a rotary tool of the class described, a handle provided in its forward portion with an axial bore, a sleeve seated in said bore and projecting from the end thereof, a tool shank mounted for rotation in said sleeve, the inner end of said sleeve being countersunk, a head formed on the inner end of said shank and bearing against the counter sunk end of the sleeve the outer face of which head is rounded and a thrust bearing member seated in the handle at the inner end of the bore, which thrust bearing member is provided with a rounded head against which the rounded head on the inner end of the tool shank normally engages.

In testimony whereof I affix my signature.

HERBERT E. SIMSON.